(12) United States Patent
Kawamura

(10) Patent No.: US 10,290,121 B2
(45) Date of Patent: May 14, 2019

(54) IMAGE PROCESSING APPARATUS, IMAGE PROCESSING METHOD, AND IMAGE PROCESSING PROGRAM FOR GENERATING IMAGE WITH CYCLIC PATTERN REDUCTION

(71) Applicant: FUJIFILM Corporation, Tokyo (JP)

(72) Inventor: Takahiro Kawamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 6 days.

(21) Appl. No.: 15/650,980

(22) Filed: Jul. 17, 2017

(65) Prior Publication Data

US 2018/0068468 A1  Mar. 8, 2018

(30) Foreign Application Priority Data

Sep. 8, 2016 (JP) ................. 2016-175338

(51) Int. Cl.
*G06T 5/00* (2006.01)
*G06T 11/00* (2006.01)
*G06T 7/55* (2017.01)
*G06T 5/50* (2006.01)

(52) U.S. Cl.
CPC ............ *G06T 11/005* (2013.01); *G06T 5/002* (2013.01); *G06T 5/50* (2013.01); *G06T 7/55* (2017.01); *G06T 11/00* (2013.01); *G06T 2207/10116* (2013.01); *G06T 2207/20056* (2013.01)

(58) Field of Classification Search
None
See application file for complete search history.

(56) References Cited

U.S. PATENT DOCUMENTS

| 9,165,358 | B2 | 10/2015 | Imai | |
|---|---|---|---|---|
| 2014/0023257 | A1* | 1/2014 | Imai | A61B 6/5252 382/131 |
| 2014/0371587 | A1* | 12/2014 | Vanderby | A61B 8/5253 600/438 |

FOREIGN PATENT DOCUMENTS

JP  2012-200315  10/2012

\* cited by examiner

*Primary Examiner* — Tahmina N Ansari
(74) *Attorney, Agent, or Firm* — JCIPRNET

(57) ABSTRACT

An image acquisition unit acquires first and second radiation images from first and second radiation detectors. A first frequency analysis unit detects a first frequency component with respect to the first radiation image. A registration unit acquires a spatial correspondence relationship between the first radiation image and the second radiation image. A second frequency analysis unit corrects the first frequency component on the basis of the correspondence relationship to calculate a second frequency component with respect to the second radiation image.

5 Claims, 8 Drawing Sheets

IMAGE PROCESSING APPARATUS, IMAGE PROCESSING METHOD, AND IMAGE PROCESSING PROGRAM FOR GENERATING IMAGE WITH CYCLIC PATTERN REDUCTION

CROSS REFERENCE TO RELATED APPLICATIONS

The present application claims priority under 35 U.S.C. § 119 to Japanese Patent Application No. 2016-175338 filed on Sep. 8, 2016. The above application is hereby expressly incorporated by reference, in its entirety, into the present application.

BACKGROUND

1. Field of the Invention

The present invention relates to an image processing apparatus, an image processing method, and an image processing program for reducing a cyclic pattern caused by a scattered ray removing grid, included in a radiation image captured using the scattered ray removing grid.

2. Description of the Related Art

In the related art, an energy subtraction process that uses two radiation images obtained by irradiating a subject with radiation rays having two different kinds of energies using the fact that the amount of attenuation of transmitted radiation varies according to a material that forms the subject is known. The energy subtraction process refers to a method for matching pixels of two radiation images obtained in this way with each other, performing subtraction between the pixels in a state where appropriate weight coefficients are multiplied, and acquiring an image obtained by extracting a specific structure. For example, in a case where a soft portion image in which a bone portion is removed from a radiation image obtained by imaging a chest portion is generated by performing such an energy subtraction process, it is possible to observe shading in a soft portion without interference of the bone portion. Contrarily, in a case where a bone portion image from which a soft portion is removed is generated, it is possible to observe shading in a bone portion without interference of the soft portion.

In order to perform such an energy subtraction process, a subject may be imaged so that energy distributions of radiation rays in a case where two radiation images are acquired become different from each other. As an imaging method (hereinafter, referred to as energy subtraction imaging) for performing such an energy subtraction process, specifically, a two-shot method for performing imaging twice using two kinds of radiation rays having different energy distributions, and a one-shot method for disposing two radiation detectors that detect radiation to acquire radiation images in an overlapping manner, and simultaneously irradiating the two radiation detectors disposed in an overlapping manner with radiation that passes through a subject to irradiate the two radiation detectors with radiation rays of different energy distributions are known.

On the other hand, in a case where a radiation image of a subject is captured using radiation that passes through the subject, radiation is scattered in the subject to generate scattered rays, the contrast of an acquired radiation image deteriorates due to the scattered rays. Thus, in imaging of a radiation image, a scattered ray removing grid (hereinafter, simply referred to as a grid) may be disposed between a subject and a radiation detector to perform imaging so that the radiation detector is not irradiated with scattered rays. In a case where imaging is performed using such a grid, since the radiation detector is not easily irradiated with radiation scattered by the subject, it is possible to enhance the contrast of a radiation image.

The grid has a configuration in which lead or the like that does not transmit radiation and an inter-space material such as aluminum or fibers that easily transmit radiation are alternately disposed at a fine grid density of about 4.0 pieces/mm, for example. Thus, in a case where imaging is performed using such a grid, a cyclic pattern such as a cycle stripe and moiré caused by the grid occurs in an obtained radiation image, to thereby make it difficult to view the radiation image. The moire is a fine cyclic pattern generated in a case where the grid density is larger than a Nyquist frequency of a radiation image.

Accordingly, a variety of methods for obtaining an image capable of being easily observed, from which a cyclic pattern is reduced, by performing a filtering process for analyzing a frequency of a radiation image, detecting a frequency component of a frequency pattern caused by a grid, and removing the frequency component of the cyclic pattern, with respect to the radiation image, has been proposed (see JP2012-200315A). Further, a method for shaking, in imaging of a radiation image, a scattered ray removing grid in a direction that is approximately perpendicular to a traveling direction of radiation to prevent the manifestation of a grid image in the radiation image and to reduce the occurrence of moiré has also been performed.

SUMMARY

However, even in a case where the above-mentioned energy subtraction imaging is performed, a method for enhancing the contrast of a radiation image using a scattered ray removing grid may be considered. Here, in a case where the energy subtraction imaging is performed using a one-shot method, a radiation detector that is disposed on a side more distant from a radiation source is irradiated with radiation that passes through a radiation detector that is disposed on a side close to the radiation source. In such a situation, since the radiation is absorbed into the radiation detector disposed on the side closer to the radiation source, the amount of radiation that arrives at the radiation detector disposed on the side more distant from the radiation source is smaller than the amount of radiation that arrives at the radiation detector disposed on the side closer to the radiation source. Thus, in a radiation image detected by the radiation detector disposed on the side more distant from the radiation source, granulation deteriorates due to an insufficient radiation amount, and thus, noise increases. As a result, there is a concern that it is not possible to detect a frequency component of a cyclic pattern caused by the grid. In this way, in a case where it is not possible to detect the frequency component of the cyclic pattern caused by the grid, it is not possible to remove the cyclic pattern from the radiation image. Accordingly, even in a case where the amount of radiation that arrives at the radiation detector is small, it is important to calculate the frequency component of the cyclic pattern caused by the grid in terms of enhancement of image quality of the radiation image.

In consideration of the above problems, an object of the invention is to provide an image processing apparatus, an image processing method, and an image processing program for reducing a frequency component caused by a scattered ray removing grid, in which even in a case where the amount of radiation that arrives at a detector is small, it is possible to calculate a frequency component of a cyclic pattern caused by the grid.

According to an aspect of the invention, there is provided an image processing apparatus comprising: image acquisition unit for acquiring two radiation images obtained by irradiating two detection unit disposed in an overlapping manner with radiation emitted from a radiation source and passed through a subject through a scattered ray removing grid for removing scattered rays passed through the subject; first frequency analysis unit for detecting a first frequency component which is a frequency component of a cyclic pattern caused by the scattered ray removing grid, with respect to a first radiation image, from the first radiation image acquired by first radiation detection unit that is disposed on a side closer to the radiation source among the two radiation images; registration unit for acquiring a spatial correspondence relationship between the first radiation image and a second radiation image acquired by second radiation detection unit that is disposed on a side more distant from the radiation source among the two radiation images; and second frequency analysis unit for correcting the first frequency component on the basis of the correspondence relationship to calculate a second frequency component which is a frequency component of a cyclic pattern caused by the scattered ray removing grid, with respect to the second radiation image.

The "detection unit" may employ a radiation detector, or may employ a storage phosphor sheet using storage phosphor that stores a part of radiation energy by the irradiation of radiation, and then, emits photostimulated luminescence light based on the stored radiation energy by irradiation of excitation light such as visible light or laser light. In a case where the detection unit is the radiation detector, the image acquisition unit may acquire a radiation image indicated by an image signal output from the radiation detector. In a case where the detection unit is the storage phosphor sheet, radiation image information is stored and recorded on the storage phosphor sheet once by irradiating the storage phosphor sheet with radiation that passes through a subject using an imaging apparatus, the storage phosphor sheet is irradiated with excitation light using an image reader to generate photostimulated luminescence light, and the photostimulated luminescence light is photoelectrically converted to generate an image signal indicating a radiation image. Thus, the image acquisition unit may acquire the radiation image indicated by the image signal generated in this way.

The "two detection unit disposed in an overlapping manner" unit that two detection unit are disposed in an overlapping manner in an irradiation direction of radiation so that radiation that passes through the first radiation detection unit disposed on the side closer to the radiation source is projected to the second detection unit disposed on the side more distant from the radiation source. The two detection unit may be brought into close contact with each other, may be disposed so that an energy converting filter formed of a copper plate or the like may be interposed, or may be disposed so that air may be interposed therebetween.

The image processing apparatus according to this aspect of the invention may further comprise frequency processing unit for performing a frequency processing process for reducing the cyclic pattern included in the first radiation image on the basis of the first frequency component to generate a first cyclic pattern reduction image.

Further, in the image processing apparatus according to this aspect of the invention, the frequency processing unit may further perform a frequency processing process for reducing the cyclic pattern included in the second radiation image on the basis of the second frequency component to generate a second cyclic pattern reduction image.

Further, the image processing apparatus according to this aspect of the invention may further comprise weighting calculation processing unit for performing a weighting calculation process with respect to the first cyclic pattern reduction image and the second cyclic pattern reduction image to generate a processed image.

In this case, the weighting calculation process may be a subtraction process of performing weighting and subtraction between corresponding pixels with respect to the first cyclic pattern reduction image and the second cyclic pattern reduction image to generate a subtraction image obtained by extracting a specific structure of the subject as the processed image.

Further, the weighting calculation process may be a weighting addition process of performing weighting and addition between corresponding pixels with respect to the first cyclic pattern reduction image and the second cyclic pattern reduction image to generate an addition image in which a dynamic range of the subject is enlarged as the processed image.

According to another aspect of the invention, there is provided an image processing method comprising: acquiring two radiation images acquired by irradiating two detection unit disposed in an overlapping manner with radiation emitted from a radiation source and passed through a subject through a scattered ray removing grid for removing scattered rays passed through the subject; detecting a first frequency component which is a frequency component of a cyclic pattern caused by the scattered ray removing grid, with respect to a first radiation image, from the first radiation image acquired by first radiation detection unit that is disposed on a side closer to the radiation source among the two radiation images; acquiring a spatial correspondence relationship between the first radiation image and a second radiation image acquired by second radiation detection unit that is disposed on a side more distant from the radiation source among the two radiation images; and correcting the first frequency component on the basis of the correspondence relationship to calculate a second frequency component which is a frequency component of a cyclic pattern caused by the scattered ray removing grid, with respect to the second radiation image.

According to still another aspect of the invention, a program for causing a computer to execute the image processing method according to the above-described aspect of the invention may be provided.

According to the invention, a first frequency component which is a frequency component of a cyclic pattern caused by the scattered ray removing grid is detected from a first radiation image acquired by the first detection unit disposed on the side closer to the radiation source among two radiation images, with respect to the first radiation image. Further, a spatial correspondence relationship between the first radiation image and a second radiation image acquired by the second radiation detection unit disposed on the side more distant from the radiation source is acquired, and the first frequency component is corrected on the basis of the correspondence relationship to calculate a second frequency component which is a frequency component of a cyclic pattern caused by the scattered ray removing grid, with respect to the second radiation image. Thus, in the second radiation image, even in a case where granulation deteriorates due to a shortage of the amount of radiation, it is possible to obtain a frequency component of a cyclic pattern caused by the grid in the second radiation image.

DETAILED DESCRIPTION

Figure 1:
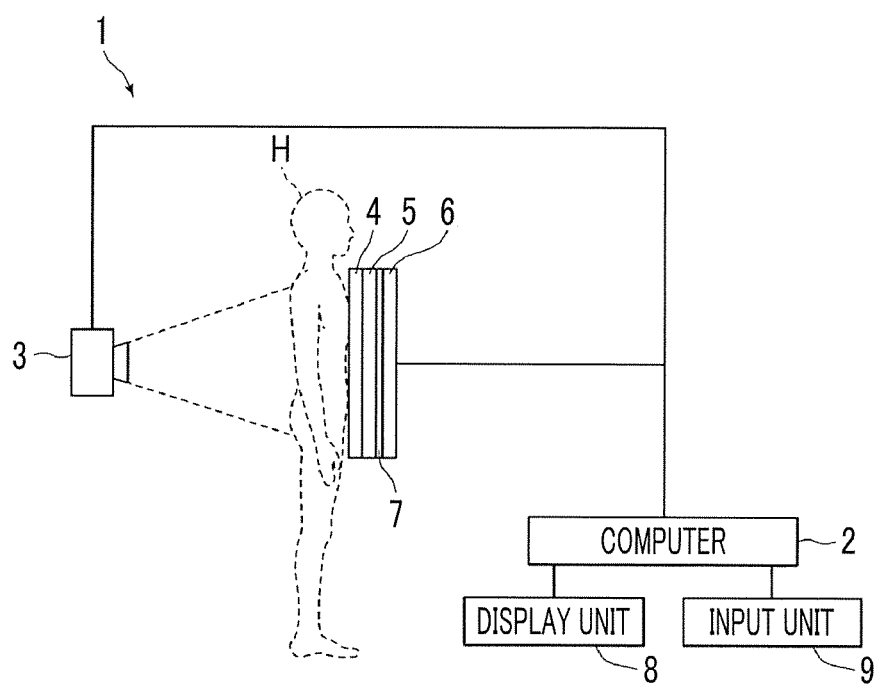
FIG. 1 is a block diagram showing a schematic configuration of a radiation imaging system to which an image processing apparatus according to a first embodiment of the invention is applied.

Hereinafter, embodiments of the invention will be described with reference to the accompanying drawings. FIG. 1 is a block diagram showing a schematic configuration of a radiation imaging system to which an image processing apparatus according to a first embodiment of the invention is applied. As shown in FIG. 1, the radiation imaging system according to the embodiment captures two radiation images having different energy distributions using a scattered ray removing grid, and performs an energy subtraction process using the two radiation images. The radiation imaging system includes an imaging apparatus 1, and a computer 2 that includes the image processing apparatus according to this embodiment.

The imaging apparatus 1 is an imaging apparatus for performing so-called one-shot energy subtraction for converting the energy of X-rays emitted from an X-ray source 3 which is a radiation source and passed through a subject H and irradiating a first radiation detector 5 and a second radiation detector 6 with the energy-converted X-rays. In imaging, as shown in FIG. 1, a scattered ray removing grid 4, the first radiation detector 5, an X-ray energy converting filter 7 formed of a copper plate or the like, and the second radiation detector 6 are disposed sequentially from a side closer to the X-ray source 3, and then, the X-ray source 3 is driven. The first and second radiation detectors 5 and 6, and the X-ray energy converting filter 7 are brought into close contact with each other.

Thus, in the first radiation detector 5, a first radiation image G1 of the subject H based on X-rays of low energy including so-called soft rays is acquired. Further, in the second radiation detector 6, a second radiation image G2 of the subject H based on X-rays of high energy from which the soft rays are removed is acquired. The first and second radiation images are input to the computer 2 which is an image processing apparatus. The first and second radiation detectors 5 and 6 correspond to detection unit.

The first and second radiation detectors 5 and 6 are able to repeat recording and reading of radiation images. The first and second radiation detectors 5 and 6 may be a so-called direct type radiation detector that directly receives irradiation of radiation to generate electric charges, or may be a so-called indirect-type radiation detector that converts visible light into an electric charge signal. Further, it is preferable that a reading method of a radiation image signal is a so-called thin film transistor (TFT) reading method for switching a TFT switch on and off to read a radiation image signal, or may be a so-called optical reading method for reading a radiation image signal with irradiation of reading light, but the reading method is not limited thereto and may be other methods.

Further, in imaging of the subject H, as described above, the scattered ray removing grid (hereinafter, referred to as a grid) 4 for removing scattered rays scattered by the subject H is provided between the subject H and the first radiation detector 5. The grid 4 is formed such that lead or the like that does not transmit radiation and an inter-space material such as aluminum or fibers that easily transmit radiation are alternately disposed at a fine grid density of about 4.0 pieces/mm, for example.

A display unit 8 and an input unit 9 are connected to the computer 2. The display unit 8 includes a cathode ray tube (CRT), a liquid crystal display, or the like, and performs assistance of a radiation image acquired through imaging and a variety of inputs necessary for processes performed by the computer 2. The input unit 9 includes a keyboard, a mouse, a touch panel, or the like.

An image processing program of this embodiment is installed in the computer 2. In this embodiment, the computer 2 may be a work station or a personal computer that is directly operated by an operator or may be a server computer that is connected thereto through a network. The image processing program may be recorded on a recording medium such as a digital versatile disc (DVD) or a compact disc read-only memory (CD-ROM) for distribution and may be installed into the computer from the recording medium. Alternatively, the image processing program may be stored in a storage device of a server computer connected to a network or a network storage in an accessible state from the outside and may be downloaded into the computer as necessary for installation.

Figure 2:
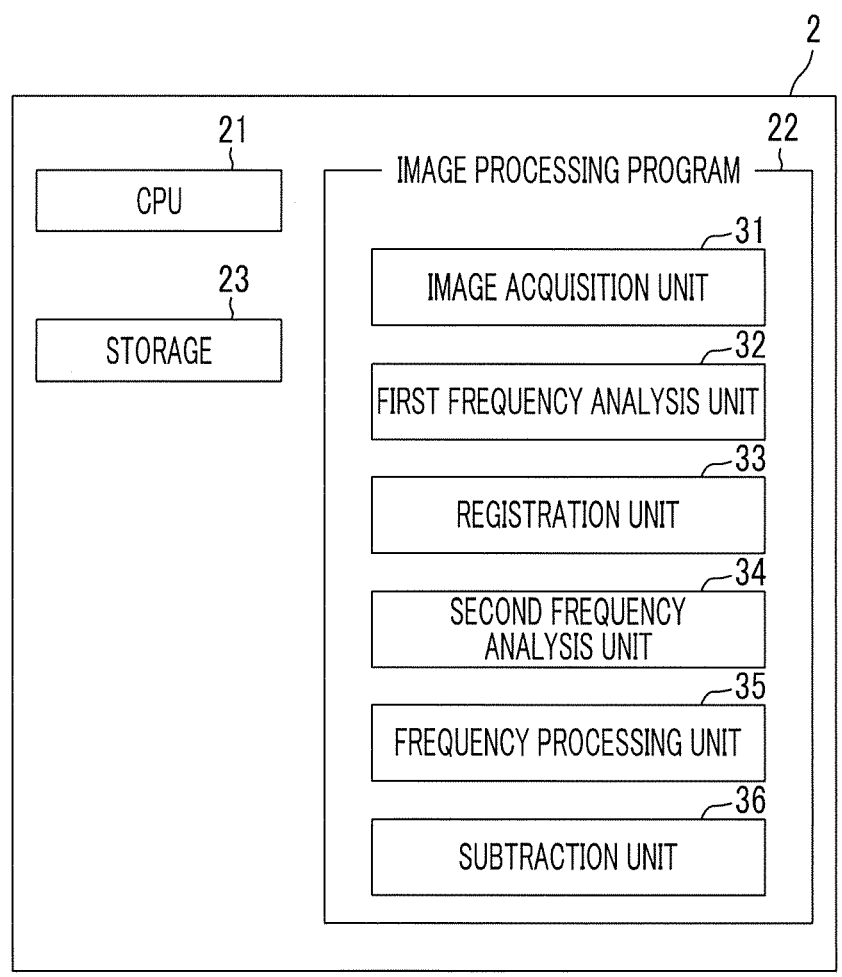
FIG. 2 is a diagram showing a schematic configuration of the image processing apparatus according to the first embodiment.

FIG. 2 is a diagram showing a schematic configuration of an image processing apparatus realized by installing an image processing program on the computer 2 in this embodiment. As shown in FIG. 2, the image processing apparatus includes a central processing unit (CPU) 21, a memory 22, and a storage 23 as components of a standard computer.

The storage 23 includes a storage device such as a hard disk or a solid-state drive (SSD), and stores a variety of information including a program and an image processing program for driving respective units of the imaging apparatus 1. The storage 23 also stores a radiation image acquired through imaging.

A program or the like stored in the storage 23 is temporarily stored in the memory 22 in order to cause the CPU 21 to execute various processes. The image processing program defines, processes to be executed by the CPU 21, an image acquisition process of causing the imaging apparatus 1 to perform imaging to acquire the first and second radiation images G1 and G2, a first frequency analysis process of detecting a first frequency component which is a frequency component of a cyclic pattern caused by the grid 4, with respect to the first radiation image G1, from the first radiation image G1 acquired by the first radiation detector 5 that is disposed on the side closer to the X-ray source 3, a registration process of acquiring a spatial correspondence relationship between the first radiation image G1 and the second radiation image G2 acquired by the second radiation detector 6 that is disposed on a side more distant from the X-ray source 3, a second frequency analysis process of correcting the first frequency component on the basis of the correspondence relationship to calculate a second frequency component which is a frequency component of a cyclic pattern caused by the grid 4, with respect to the second radiation image G2, a frequency processing process of reducing a cyclic pattern included in the first radiation image G1 on the basis of the first frequency component to generate a first cyclic pattern reduction image G11 and reducing a cyclic pattern included in the second radiation image G2 on the basis of the second frequency component to generate a second cyclic pattern reduction image G12, and a subtraction process of performing weighting and subtraction between corresponding pixels with respect to the first cyclic pattern reduction image G11 and the second cyclic pattern reduction image G12 to generate a subtraction image Gsub obtained by extracting a specific structure of the subject H.

Further, as the CPU 21 executes these processes according to the image processing program, the computer 2 functions as an image acquisition unit 31, a first frequency analysis unit 32, a registration unit 33, a second frequency analysis unit 34, a frequency processing unit 35, and a subtraction unit 36. The computer 2 may include a processor or a processing circuit that performs the first frequency analysis process, the registration process, the second frequency analysis process, the frequency processing process, and the subtraction process, respectively. Further, the subtraction unit 36 corresponds to weighting calculation processing unit.

Figure 3:
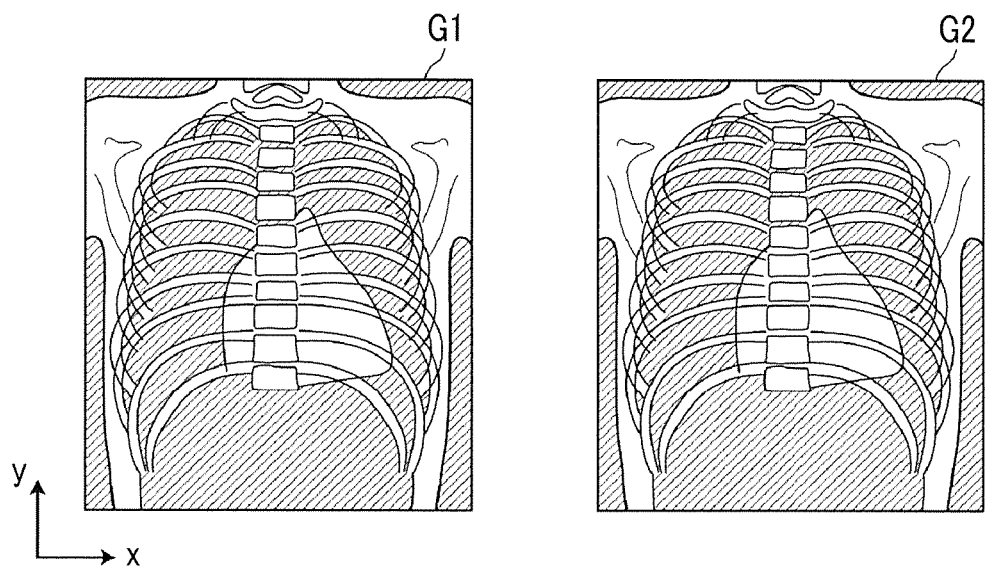
FIG. 3 is a diagram showing first and second radiation images.

The image acquisition unit 31 drives the X-ray source 3 to irradiate the subject H with X-rays, detects the X-rays that pass through the subject H, from which scattered rays are removed by the grid 4, using the first and second radiation detectors 5 and 6, and acquires the first and second radiation images G1 and G2. The first and second radiation images G1 and G2 may be acquired using a separate program other than the image processing program and may be stored in the storage 23. In this case, the image acquisition unit 31 reads the first and second radiation images G1 and G2 stored in the storage 23 from the storage 23 for image processing of the first and second radiation images G1 and G2. In a case where a chest portion of the subject H is imaged, the first and second radiation images G1 and G2 shown in FIG. 3 are acquired.

Figure 4:
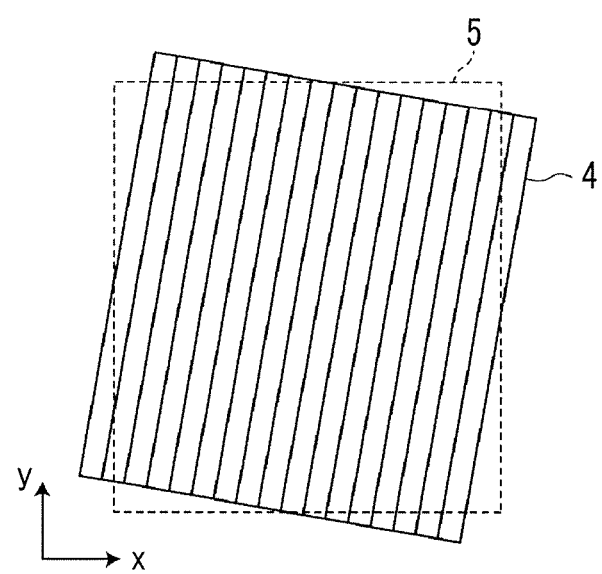
FIG. 4 is a diagram showing an inclination of a grid with respect to a first radiation detector.

The first frequency analysis unit 32 detects a first frequency component which is a frequency component of a cyclic pattern caused by the grid 4 with respect to the first radiation image G1. Specifically, the first frequency analysis unit 32 performs frequency analysis using Fourier transform, high-speed Fourier transform, or the like with respect to the first radiation image G1, to thereby acquire a frequency spectrum of the first radiation image G1. In imaging, it is difficult to strictly match an x-direction or a y-direction of the first radiation detector 5 with a direction in which members that form the grid 4 extend. In such a case, as shown in FIG. 4, in imaging, the grid 4 is inclined with respect to the first radiation detector 5. Thus, the first frequency analysis unit 32 performs frequency analysis with respect to the first radiation image G1 in the x-direction and the y-direction to acquire a frequency spectrum in the x-direction and the y-direction and detects a first frequency component in the x-direction and the y-direction.

Figure 5:
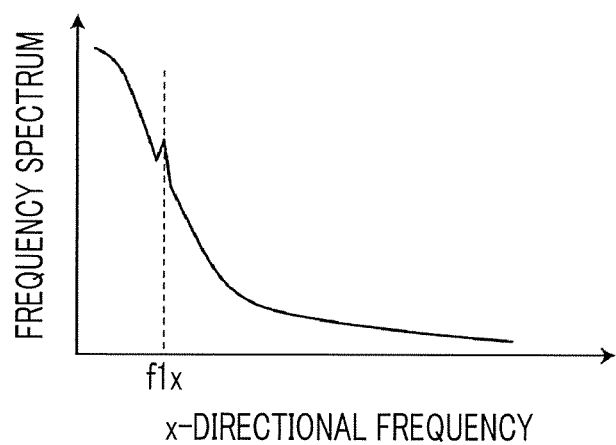
FIG. 5 is a diagram showing an x-directional frequency spectrum.
Figure 6:
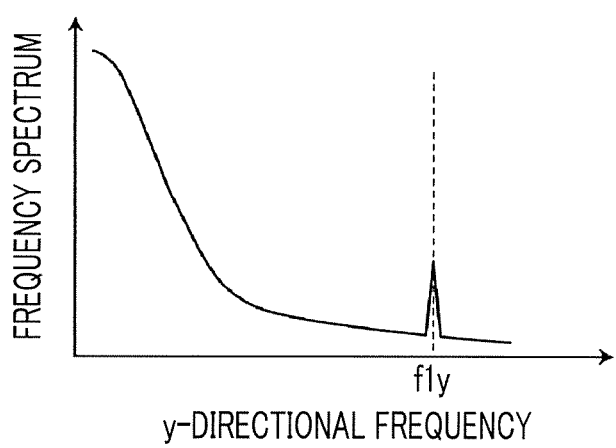
FIG. 6 is a diagram showing a y-directional frequency spectrum.

FIG. 5 is a diagram showing an x-directional frequency spectrum, and FIG. 6 is a diagram showing a y-directional frequency spectrum. In the frequency spectra, a transverse axis represents a frequency in each direction (cycle/mm), and a longitudinal axis represents the size of frequency response. As shown in FIGS. 5 and 6, the frequency spectrum in each direction has a peak in a frequency corresponding to an original cycle structure of a grid. The first frequency analysis unit 32 detects peak frequencies of frequency spectra in the x-direction and the y-direction as a first frequency component (f1x, f1y) with respect to the first radiation image G1.

The registration unit 33 acquires a spatial correspondence relationship between the first radiation image G1 and the second radiation image G2. Specifically, the registration unit 33 performs registration using a known registration method such as affine transformation to acquire a correspondence relationship P0. Here, the first and second radiation detectors 5 and 6 are disposed in an overlapping manner with respect to a traveling direction of X-rays. Thus, the positional relationship between the first radiation image G1 and the second radiation image G2 may be determined by a magnification ratio R, a parallel shift amount (x, y), and an in-plane rotational angle θ. Here, since the second radiation detector 6 is disposed at a position more distant from the X-ray source 3 compared with the first radiation detector 5, the second radiation image G2 is greatly enlarged compared with the first radiation image G1. Accordingly, the magnification ratio R becomes a value larger than 1. The registration unit 33 acquires the magnification ratio R, the parallel shift amount (x, y), and the in-plane rotational angle θ as the correspondence relationship P0. Since the parallel shift amount (x, y) is not used for calculation of a second frequency characteristic (which will be described later), the parallel shift amount (x, y) may not be calculated.

Figure 7:
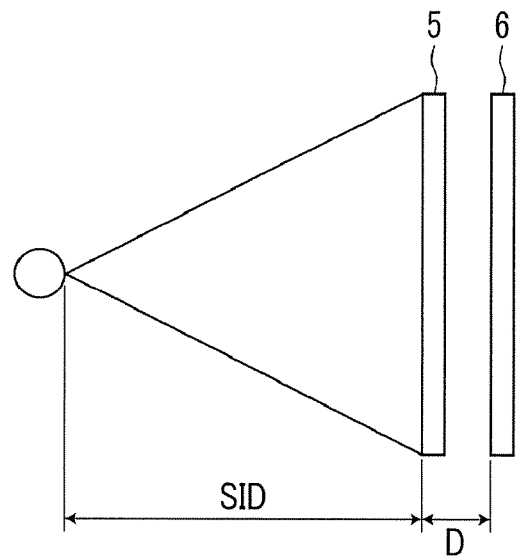
FIG. 7 is a diagram showing a positional relationship between a first radiation detector and a second radiation detector.

The correspondence relationship P0 may be calculated from a positional relationship of the first and second radiation detectors 5 and 6 in the imaging apparatus 1. That is, as shown in FIG. 7, in the imaging apparatus 1, an interval D between detection surfaces of the first and second radiation detectors 5 and 6 is already known from the thickness of the X-ray energy converting filter 7 and the configuration of the imaging apparatus 1. Further, a "source to image distance (SID)" which is a distance between the X-ray source 3 and the detection surface of the first radiation detector 5 is already known. Accordingly, the magnification ratio R may be calculated by Expression (1) using the SID and the interval D.

$$R=(SID+D)/SID \qquad (1)$$

The parallel shift amount (x, y) and the in-plane rotational angle θ may be calculated in advance using an image acquired by the first and second radiation detectors 5 and 6 by performing imaging of a marker or the like, and may be stored in the storage 23.

The second frequency analysis unit 34 corrects the first frequency component (f1x, f1y) on the basis of the correspondence relationship P0 to calculate a second frequency component (f2x, f2y) which is a frequency component of a cyclic pattern caused by the grid 4, with respect to the second radiation image G2. The magnification ratio R and the in-plane rotational angle θ are important for the calculation of the second frequency component (f2x, f2y) in the spatial correspondence relationship P0 between the first radiation image G1 and the second radiation image G2. The cyclic pattern caused by the grid uniformly appears on the entire surface of the second radiation image G2. Thus, in order to calculate the second frequency component (f2x, f2y), the parallel shift amount (x, y) is not necessary.

The second frequency analysis unit 34 calculates the second frequency component (f2x, f2y) by Expression (2) and Expression (3) from the first frequency component (f1x, f1y) by using the magnification ratio R and the in-plane rotational angle θ.

$$f2x = \sqrt{(f1x^2 + f1y^2)} \times \cos\theta \times 1/R \quad (2)$$

$$f2y = \sqrt{(f1x^2 + f1y^2)} \times \sin\theta \times 1/R \quad (3)$$

Here, since the magnification ratio R is larger than 0, the number of frequency patterns per unit length in the second radiation image G2 is smaller than that in the first radiation image G1, and as a result, the frequency of the second frequency component is smaller than the frequency of the first frequency component. Accordingly, it is possible to calculate the second frequency component (f2x, f2y) by dividing the first frequency component (f1x, f1y) by the magnification ratio R.

In FIGS. 5 and 6, only one peak appears in the frequency response, but a plurality of peaks may appear due to a second higher harmonic, a third higher harmonic, or the like, which are causes of moiré according to a grid density of the grid 4 and a sampling interval in a case where the first and second radiation images G1 and G2 are acquired. In this case, by calculating frequencies of all the peaks as a first frequency characteristic, it is possible to calculate a second frequency characteristic corresponding to the frequency of each peak in a similar way to Expression (2) and Expression (3).

The frequency processing unit 35 performs a frequency processing process of reducing the cyclic pattern included in the first radiation image G1 on the basis of the first frequency component (f1x, f1y) to generate the first cyclic pattern reduction image G11. Specifically, the frequency processing unit 35 performs a filtering process using a filter that reduces the frequency component f1x with respect to the first radiation image G1 in the x direction, and performs a filtering process using a filter that reduces the frequency component f1y with respect to the first radiation image G1 in the y direction, to thereby generate the first cyclic pattern reduction image G11. Further, the frequency processing unit 35 performs a frequency processing process of reducing a cyclic pattern included in the second radiation image G2 on the basis of the second frequency component (f2x, f2y) to generate the second cyclic pattern reduction image G12. Specifically, the frequency processing unit 35 performs a filtering process using a filter that reduces the frequency component f2x with respect to the second radiation image G2 in the x direction, and performs a filtering process using a filter that reduces the frequency component f2y with respect to the second radiation image G2 in the y direction, to thereby generate the second cyclic pattern reduction image G12. In a case where the first and second frequency components include frequency components with respect to a plurality of peaks such as a second higher harmonic, it is preferable to perform filtering using a filter that reduces frequency components of all the peaks.

Figure 8:
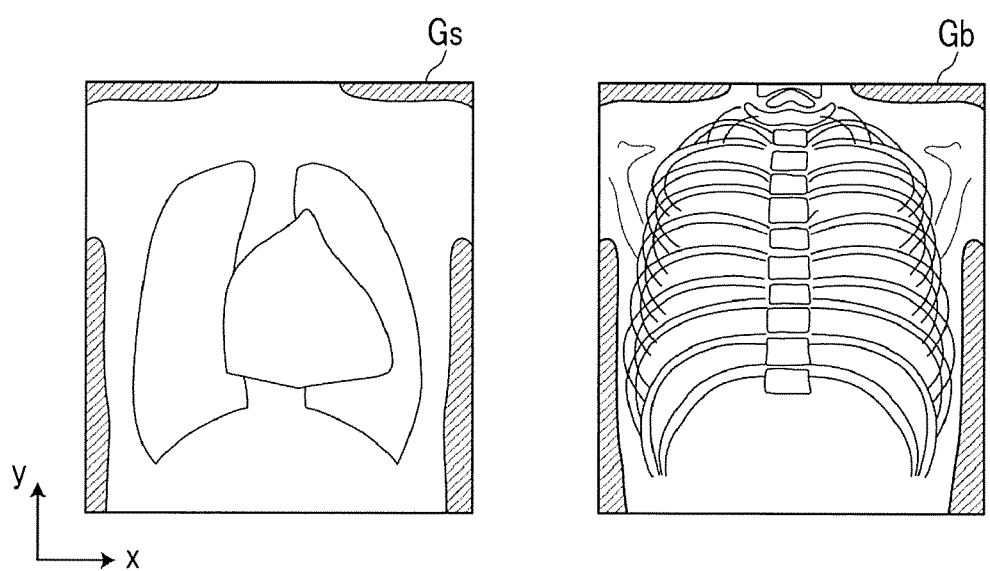
FIG. 8 is a diagram showing a soft portion image and a bone portion image.

The subtraction unit 36 performs weighting and subtraction between corresponding pixels with respect to the first cyclic pattern reduction image G11 and the second cyclic pattern reduction image G12 to generate a subtraction image Gsub obtained by extracting the specific structure of the subject H. For example, in a case where the first and second radiation images G1 and G2 are radiation images of the chest portion as shown in FIG. 3, by appropriately performing weighting and subtraction with respect to the first cyclic pattern reduction image G11 and the second cyclic pattern reduction image G12, as shown in FIG. 8, a soft portion image Gs obtained by extracting only a soft portion of the subject H and a bone portion image Gb obtained by extracting only a bone portion are generated. Here, the registration of the first cyclic pattern reduction image G11 and the second cyclic pattern reduction image G12 may be performed using the correspondence relationship P0 calculated by the registration unit 33.

Figure 9:
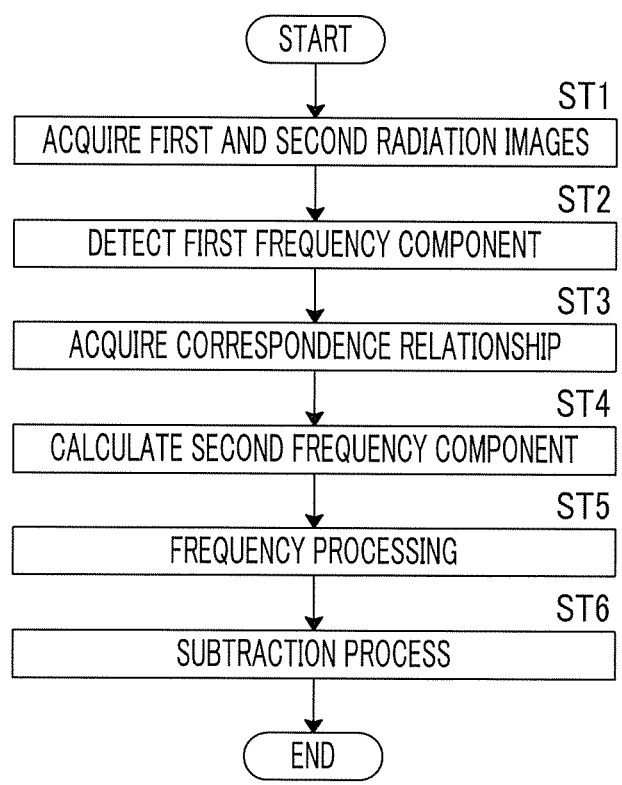
FIG. 9 is a flowchart showing processes performed in the first embodiment.

Then, processes performed in the first embodiment will be described. FIG. 9 is a flowchart showing processes performed in the first embodiment. First, the image acquisition unit 31 acquires the first and second radiation images G1 and G2 from the first and second radiation detectors 5 and 6 (step ST1). Then, the first frequency analysis unit 32 detects the first frequency component (f1x, f1y) with respect to the first radiation image G1 (step ST2). Further, the registration unit 33 acquires the spatial correspondence relationship P0 between the first radiation image G1 and the second radiation image G2 (step ST3). Further, the second frequency analysis unit 34 corrects the first frequency component (f1x, f1y) on the basis of the correspondence relationship P0 to calculate the second frequency component (f2x, f2y) with respect to the second radiation image G2 (step ST4).

Then, the frequency processing unit 35 performs the frequency processing process (step ST5). That is, the frequency processing unit 35 reduces a cyclic pattern included in the first radiation image G1 on the basis of the first frequency component (f1x, f1y) to generate the first cyclic pattern reduction image G11, and reduces a cyclic pattern included in the second radiation image G2 on the basis of the second frequency component (f2x, f2y) to generate the second cyclic pattern reduction image G12. Further, the subtraction unit 36 performs weighting and subtraction between corresponding pixels with respect to the first cyclic pattern reduction image G11 and the second cyclic pattern reduction image G12 to generate a subtraction image Gsub obtained by extracting the specific structure of the subject H (step ST6), and then, the processes are terminated.

In this way, in this embodiment, the first frequency component (f1x, f1y) is detected from the first radiation image G1 acquired by the first radiation detector 5 which is disposed on the side closer to the X-ray source 3, and the first frequency component (f1x, f1y) is corrected on the basis of the spatial correspondence relationship P0 between the first and second radiation images G1 and G2, so that the second frequency component (f2x, f2y) is calculated with respect to the second radiation image G2. Thus, in the second radiation image G2, even in a case where granulation deteriorates due to shortage of the amount of radiation, it is possible to obtain a frequency component of a cyclic pattern caused by the grid 4 in the second radiation image G2.

Further, by reducing the cyclic pattern included in the first radiation image G1 on the basis of the first frequency component (f1x, f1y) to generate the first cyclic pattern reduction image G11, it is possible to reduce the cyclic pattern caused by the grid 4 included in the first radiation image G1.

Furthermore, by reducing the cyclic pattern included in the second radiation image G2 on the basis of the second frequency component (f2x, f2y) to generate the second cyclic pattern reduction image G12, it is possible to reduce the cyclic pattern caused by the grid 4 included in the second radiation image G2.

Further, by performing the subtraction process with respect to the first cyclic pattern reduction image G11 and the second cyclic pattern reduction image G12, it is possible to perform the subtraction process using an image in which a cyclic pattern is suppressed, and thus, it is possible to generate the high quality subtraction image Gsub that does not include a cyclic pattern.

Figure 10:
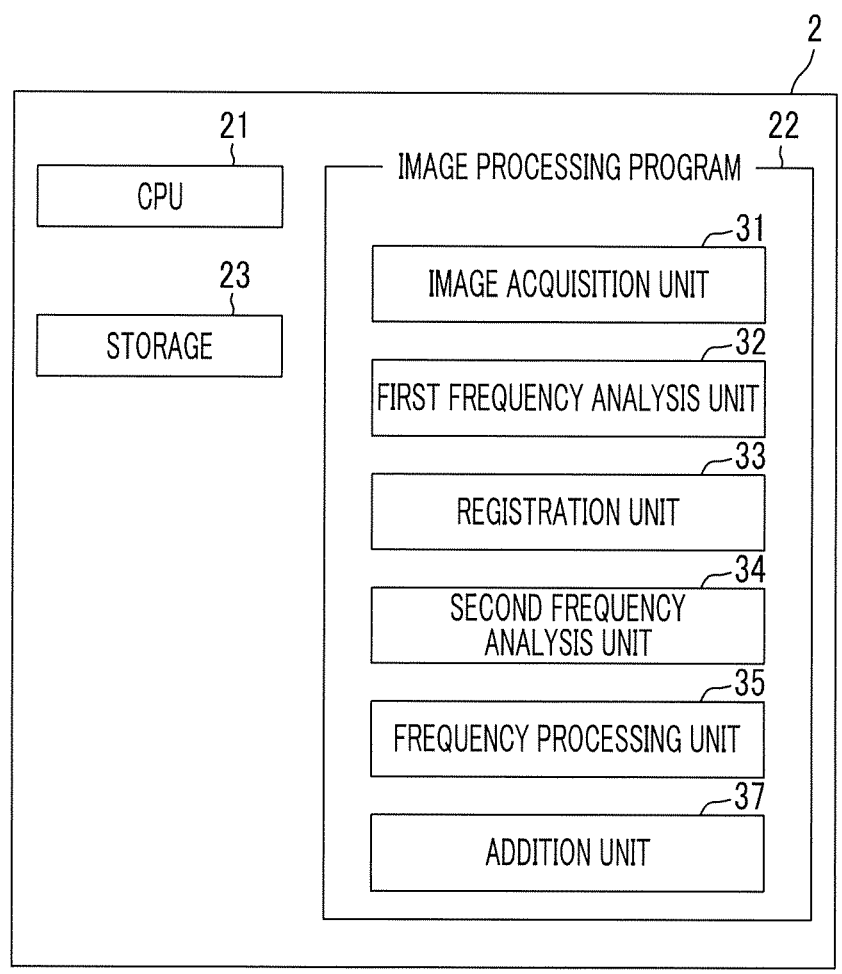
FIG. 10 is a diagram showing a schematic configuration of an image processing apparatus according to a second embodiment.

Next, a second embodiment of the invention will be described. FIG. 10 is a diagram showing a schematic configuration of an image processing apparatus realized by installing an image processing program on the computer 2. In FIG. 10, the same reference numerals are given to the same configurations in FIG. 2, and detailed descriptions thereof will not be repeated. As shown in FIG. 10, the image processing apparatus in the second embodiment is different from the first embodiment in that an addition unit 37 is provided instead of the subtraction unit 36. In the second embodiment, imaging of a subject H is performed in a state where the X-ray energy converting filter 7 is not disposed.

Here, in the first radiation detector 5 and the second radiation detector 6, since the first radiation detector 5 is closer to the X-ray source 3, the amount of radiation in the radiation detector 5 is larger than that in the second radiation detector 6. Thus, the first radiation image G1 has a small amount of noise components. On the other hand, in a case where a subject H having a large body thickness is imaged, and in a case where a portion having a large body thickness, such as the lumbar spine or hip joint, is imaged, it is necessary to increase the amount of emitted X-rays. However, in a case where the amount of radiation is increased, in a skin line portion having a small body thickness, there is a concern that the amount of X-rays emitted to the first radiation detector 5 exceeds a maximum detection radiation amount of the radiation detector. In this way, in a case where the amount of emitted X-rays exceeds the maximum detection radiation amount of the radiation image detector, the density of a portion having a small body thickness is saturated to cause black crushing. Accordingly, in the first radiation image G1, a density region capable of being observed in the subject H, that is, a dynamic range is narrowed.

Further, in the second radiation detector 6 disposed on the side more distant from the X-ray source 3, since the amount of radiation that arrives at the second radiation detector 6 is smaller than that in the first radiation detector 5, in the second radiation image G2, there is no case where the density of a thin body portion is saturated to cause black crushing. However, since the amount of radiation in a portion having a large body thickness which is the main region of interest is insufficient, granulation deteriorates, and thus, noise increases. Thus, in the second radiation image G2, it is difficult to diagnose the main region of interest.

The addition unit 37 in the second embodiment performs a weighting addition process with respect to the first cyclic pattern reduction image G11 and the second cyclic pattern reduction image G12. Here, weighting coefficients are set in consideration of granularity of the first and second radiation images G1 and G2. For example, in a case where it is assumed that the amount of radiation that arrives at a certain pixel position of the second radiation detector 6 is ⅕ of the amount of radiation that arrives at a corresponding pixel position of the first radiation detector 5, an S/N ratio of the second radiation image G2 is $\sqrt{5}$ times an S/N ratio of the first radiation image G1. Accordingly, the weighting coefficients may be set so that the weighting coefficient with respect to the first cyclic pattern reduction image G11 is $\sqrt{5}$ times a weighting coefficient with respect to the second cyclic pattern reduction image G12. Thus, it is possible to generate the processed image Gdr in which the density range of the first radiation image G1 is enlarged, that is, the dynamic range is enlarged.

Further, in the first cyclic pattern reduction image G11, in a region where black crushing or halation occurs, a weighting coefficient with respect to the first cyclic pattern reduction image G11 may be set to be small, and a weighting coefficient with respect to the second cyclic pattern reduction image G12 may be set to be large. In this case, in the second cyclic pattern reduction image G12, in a region where granulation is poor, the weighting coefficient with respect to the first cyclic pattern reduction image G11 may be set to be larger than the weighting coefficient with respect to the second cyclic pattern reduction image G12. Accordingly, it is possible to generate the processed image Gdr in which the density range of the first radiation image G1 is enlarged, that is, the dynamic range is enlarged.

Figure 11:
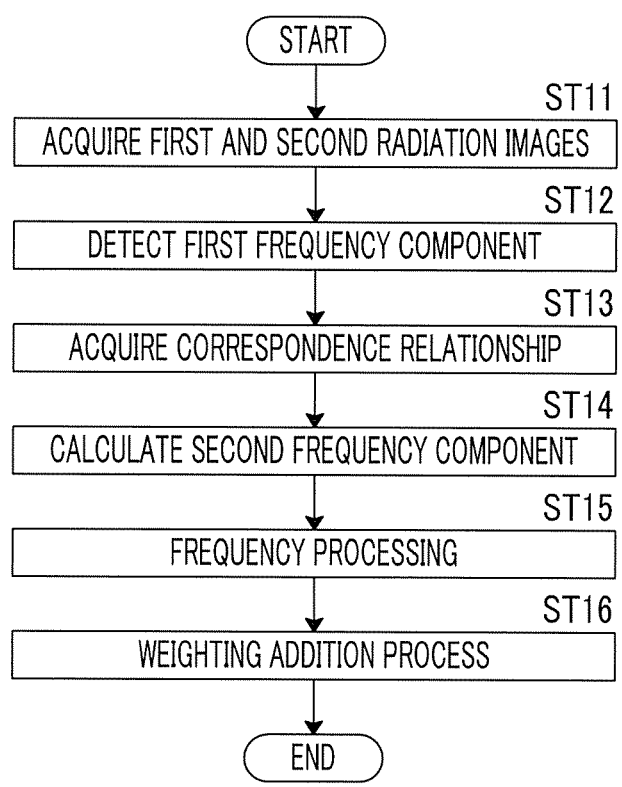
FIG. 11 is a flowchart showing processes performed in the second embodiment.

Next, processes performed in the second embodiment will be described. FIG. 11 is a flowchart showing processes performed in the second embodiment. First, the image acquisition unit 31 acquires the first and second radiation images G1 and G2 from the first and second radiation detectors 5 and 6 (step ST11). Then, the first frequency analysis unit 32 detects a first frequency component (f1x, f1y) with respect to the first radiation image G1 (step ST12). Further, the registration unit 33 acquires a spatial correspondence relationship P0 between the first radiation image G1 and the second radiation image G2 (step ST13). Then, the second frequency analysis unit 34 corrects the first frequency component (f1x, f1y) on the basis of the correspondence relationship P0 to calculate a second frequency component (f2x, f1y) with respect to the second radiation image G2 (step ST14).

Then, the frequency processing unit 35 performs a frequency processing process (step ST15). Further, the addition unit 37 performs a weighting addition process between corresponding pixels with respect to the first cyclic pattern reduction image G11 and the second cyclic pattern reduction image G12 to generate the processed image Gdr (step ST16), and then, the processes are terminated.

In the above-described first and second embodiments, the image processing is performed using radiation images acquired in the system that captures radiation images of a subject H using the first and second radiation detectors 5 and 6, but in a case where the first and second radiation images G1 and G2 are acquired using a storage fluorescent sheet which is detection unit, similarly, the invention may be applied. In this case, by irradiating two storage fluorescent sheets disposed in an overlapping manner with X-rays that pass through the subject H to store and record radiation image information on the subject H on each storage fluorescent sheet, and photoelectrically reading the radiation image information from each storage fluorescent sheet, the first and second radiation images G1 and G2 may be acquired.

Hereinafter, effects of this embodiment will be described.

By performing the weighting calculation process with respect to the first cyclic pattern reduction image and the second cyclic pattern reduction image, it is possible to perform the weighting calculation process using an image in which a cyclic pattern is reduced, and thus, it is possible to generate a high quality processed image that does not include a cyclic pattern.

By performing the weighting calculation process as a subtraction process, it is possible to generate a subtraction image obtained by extracting a specific structure of a subject as a processed image.

By performing the weighting calculation process as a weighting addition process, it is possible to generate a processed image in which a dynamic range of a subject is enlarged.

What is claimed is:

1. An image processing apparatus comprising:
a processor, configured to:
acquire two radiation images obtained by irradiating two detectors disposed in an overlapping manner with radiation emitted from a radiation source and passed through a subject through a scattered ray removing grid for removing scattered rays passed through the subject;
detect a first frequency component which is a frequency component of a cyclic pattern caused by the scattered ray removing grid, with respect to a first radiation image, from the first radiation image acquired by first a first radiation detector that is disposed on a side closer to the radiation source among the two radiation images;
acquire a spatial correspondence relationship between the first radiation image and a second radiation image acquired by a second radiation detector that is disposed on a side more distant from the radiation source among the two radiation images;
correct the first frequency component on the basis of the spatial correspondence relationship to calculate a second frequency component which is a frequency component of a cyclic pattern caused by the scattered ray removing grid, with respect to the second radiation image;
perform frequency processing on the first radiation image for reducing the cyclic pattern included in the first radiation image on the basis of the first frequency component to generate a first cyclic pattern reduction image;
perform frequency processing on the second radiation image for reducing the cyclic pattern included in the second radiation image on the basis of the second frequency component to generate a second cyclic pattern reduction image; and
perform weighting calculation on the first cyclic pattern reduction image and the second cyclic pattern reduction image to generate a processed image.

2. The image processing apparatus according to claim 1, wherein the weighting calculation is a subtraction process of performing weighting and subtraction between corresponding pixels with respect to the first cyclic pattern reduction image and the second cyclic pattern reduction image to generate a subtraction image obtained by extracting a specific structure of the subject as the processed image.

3. The image processing apparatus according to claim 1, wherein the weighting calculation is a weighting addition process of performing weighting and addition between corresponding pixels with respect to the first cyclic pattern reduction image and the second cyclic pattern reduction image to generate an addition image in which a dynamic range of the subject is enlarged as the processed image.

4. An image processing method comprising:
acquiring two radiation images acquired by irradiating two detectors disposed in an overlapping manner with radiation emitted from a radiation source and passed through a subject through a scattered ray removing grid for removing scattered rays passed through the subject;
detecting a first frequency component which is a frequency component of a cyclic pattern caused by the scattered ray removing grid, with respect to a first radiation image, from the first radiation image acquired by a first radiation detector that is disposed on a side closer to the radiation source among the two radiation images;
acquiring a spatial correspondence relationship between the first radiation image and a second radiation image acquired by a second radiation detector that is disposed on a side more distant from the radiation source among the two radiation images;
correcting the first frequency component on the basis of the spatial correspondence relationship to calculate a second frequency component which is a frequency component of a cyclic pattern caused by the scattered ray removing grid, with respect to the second radiation image;
performing frequency processing on the first radiation image for reducing the cyclic pattern included in the first radiation image on the basis of the first frequency component to generate a first cyclic pattern reduction image;
performing frequency processing on the second radiation image for reducing the cyclic pattern included in the second radiation image on the basis of the second frequency component to generate a second cyclic pattern reduction image; and
performing weighting calculation on the first cyclic pattern reduction image and the second cyclic pattern reduction image to generate a processed image.

5. A non-transitory computer-readable recording medium having stored therein an image processing program that causes a computer to execute:
a process of acquiring two radiation images acquired by irradiating two detectors disposed in an overlapping manner with radiation emitted from a radiation source and passed through a subject through a scattered ray removing grid for removing scattered rays passed through the subject;
a process of detecting a first frequency component which is a frequency component of a cyclic pattern caused by the scattered ray removing grid, with respect to a first radiation image, from the first radiation image acquired by a first radiation detector that is disposed on a side closer to the radiation source among the two radiation images;
a process of acquiring a spatial correspondence relationship between the first radiation image and a second radiation image acquired by a second radiation detector that is disposed on a side more distant from the radiation source among the two radiation images;
a process of correcting the first frequency component on the basis of the spatial correspondence relationship to calculate a second frequency component which is a frequency component of a cyclic pattern caused by the scattered ray removing grid, with respect to the second radiation image;
a process of performing frequency processing on the first radiation image for reducing the cyclic pattern included in the first radiation image on the basis of the first frequency component to generate a first cyclic pattern reduction image;
a process of performing frequency processing on the second radiation image for reducing the cyclic pattern included in the second radiation image on the basis of the second frequency component to generate a second cyclic pattern reduction image; and a process of performing weighting calculation on the first cyclic pattern reduction image and the second cyclic pattern reduction image to generate a processed image.

* * * * *